United States Patent

Uematsu et al.

[11] Patent Number: 6,120,245
[45] Date of Patent: Sep. 19, 2000

[54] COOLING STRUCTURE AROUND L SHAPED VERTICAL TYPE GAS TURBINE OUTPUT SHAFT

[75] Inventors: Kazuo Uematsu; Masahiro Masuda; Seiji Maeda, all of Takasago, Japan

[73] Assignee: Mitsubishi Heavy Industries, Ltd., Tokyo, Japan

[21] Appl. No.: 09/252,936

[22] Filed: Feb. 19, 1999

[30] Foreign Application Priority Data

Mar. 2, 1998 [JP] Japan .................................. 10-049439

[51] Int. Cl.7 ...................................................... F01D 5/08
[52] U.S. Cl. ........................................... 415/180; 415/178
[58] Field of Search .................................... 415/175, 177, 415/178, 180, 115, 116, 117; 416/90; 60/39.31, 39.75

[56] References Cited

U.S. PATENT DOCUMENTS

| 4,339,925 | 7/1982 | Eggmann et al. . |
| 5,114,309 | 5/1992 | Hengelmolen . |
| 5,713,196 | 2/1998 | Uekusa et al. .......................... 60/39.31 |

FOREIGN PATENT DOCUMENTS

| 09032795 | 2/1997 | Japan . |
| 09189240 | 7/1997 | Japan . |
| 10018858 | 1/1998 | Japan . |
| 10121984 | 5/1998 | Japan . |
| 1 514 452 | 6/1978 | United Kingdom . |
| WO99105151 | 4/1991 | WIPO . |

Primary Examiner—Edward K. Look
Assistant Examiner—Ninh Nguyen
Attorney, Agent, or Firm—Wenderoth, Lind & Ponack, L.L.P.

[57] ABSTRACT

A cooling structure around the output shaft of an L-shaped vertical gas turbine, for cooling the output shaft effectively by a natural ventilation. A gas generator 5 is arranged horizontally whereas an output turbine 1 is arranged vertically, and a pump or the like is driven by an output shaft 3. A cylinder 20 is fitted in a space 12 between the output shaft 3 and a cylindrical casing 13 and is fixed at a cylindrical flange 20*a*. Cooling air 30 is caused to flow upward from between the cylinder 20 and the output shaft 3 by the ejector effect of an exhaust gas from below a baseplate 8 and by the vacuum in the casing and then to flow downward from the upper end of the cylinder 20 between the cylinder 20 and the cylindrical casing 13, so that it flows out from the lower portion into the package. The output shaft of the L-shaped vertical type gas turbine having a compact narrow space is effectively cooled therearound by the natural ventilation without providing any fan or the like.

3 Claims, 4 Drawing Sheets

COOLING STRUCTURE AROUND L SHAPED VERTICAL TYPE GAS TURBINE OUTPUT SHAFT

BACKGROUND OF THE INVENTION

1. Field of the Invention

The present invention relates to a gas turbine having an L-shaped vertical shape, in which a gas generator is arranged horizontally whereas an output turbine is arranged vertically, and, more particularly, to a cooling structure around the output shaft of the gas turbine.

2. Description of Related Art

The prior art relating to the field of the invention has not been found but is exemplified in FIG. 4 by the fundamental structure of the L-shaped vertical type gas turbine in which the gas generator and the output turbine are coupled in the shape of letter "L", as has been proposed by us. In FIG. 4, reference numeral 1 designates an output turbine which has an output shaft 3 arranged vertically in a casing 2. Numeral 4 designates a shaft coupling to the shaft of a pump or the like. Numeral 5 designates a gas generator which is composed of a compressor, a combustor, a drive turbine and so on and connected to one end of an intermediate duct outer casing 6 to generate a hot combustion gas. This intermediate duct outer casing 6 seals an intermediate duct inner casing 7 from the outside and feeds the output turbine 1 with the hot combustion gas from the gas generator 5.

The output turbine 1 is supported in its entirety by the upper end portion of the intermediate duct outer casing 6 such that the intermediate duct outer casing 6 supports the output turbine 1 fixedly on a baseplate 8. Thus, a the intermediate duct outer casing 6 seals up the inner casing 7 and supports the output turbine 1 stably against vibrations and shocks. Numeral 9 designates a nose cone which is supported on the outer casing 2 by a support member 10 to seal up the downstream side of the output turbine 1. Numeral 11 designates a bearing for the upper portion of the output shaft 3.

Numeral 13 designates a cylindrical casing surrounding the output shaft 3 to form a space 12 between itself and the output shaft 3. Numeral 14 designates a supporting portion for supporting the circumference of the cylindrical casing 13. Numeral 15 designates a bellows which is made of a flexible material for absorbing the vertical elongations in the axial direction and shielding the circumference of the output shaft 3 and the inside of the casing.

With this construction, the hot gas, as generated by the gas generator 5, passes the intermediate duct inner casing 7 and enters the output turbine 1 to rotate the output shaft 3 and drive the pump or the like coupled to the shaft coupling 4. The hot gas rotates the output turbine 1 and is then released from the upper portion.

In order to cool the surrounding of the output shaft, there has been the cooling structure of the L-shaped vertical type gas turbine, ventilation air is introduced to around the output shaft, and cooling air is guided to the nose cone through the hollow portion of the output shaft and to the outside of the nose cone thereby to cool the output shaft portion. On the other hand, FIG. 5 shows another cooling structure of the L-shaped vertical type gas turbine which has been proposed by us. In FIG. 5, the reference numerals 1 to 11 are identical to those of FIG. 4. Numeral 30 designates the ventilation air to be sucked from the side of a reduction gear below the baseplate 8. Numeral 31 designates an air passage for allowing the air to flow around the output shaft 3 and the baseplate 8. Numeral 32 designates a plurality of air inflow holes formed at the gas entrance portion in the circumference of an upper shaft portion 3a of the output shaft 3. Numeral 33 designates ventilation holes which are so formed through the support member 10 supporting the nose cone 9 on the outer casing 2 as to communicate with the outside of the outer casing 2.

With this construction, the hot gas, as generated by the gas generator 5, passes the intermediate duct inner casing 7 and enters the output turbine 1 to rotate the output shaft 3 and to drive the pump or the like coupled to the shaft coupling 4. The hot gas rotates the output turbine 1 and is discharged from the upper portion.

The nose cone 9 has a sealed inside structure and is evacuated to a negative pressure, as compared with the atmosphere, by the discharge of the exhaust gas. The ventilation air 30 is sucked from the outside via the air passage 31 to rise, as indicated by 30a, along the circumference of the output shaft 3 and is sucked from the air inflow holes 32 around the shaft 3a of the gas inlet portion of the output turbine 1 into the shaft portion 3a, as indicated by 30b. This shaft portion 3a has a hollow inside, through which the air 30b flows into the sealed space in the nose cone 9. The air 30b further flows, as indicated by 30c, through the ventilation holes 33 formed in the support member 10 to the outside of the outer casing 1, as indicated by 30d, so that it is discharged to the outside.

By adopting the cooling structure thus far described, the circumference of the output shaft 3 and the inside of the nose cone 9 can be considerably effectively cooled by the natural ventilation. In the existing L-shaped vertical type gas turbine of FIG. 4, the heat is confined in a portion C by the radiation and the gas coming from the seal portion. This portion C is so small in space that it cannot be forcibly cooled, although preferred so.

The L-shaped vertical type gas turbine thus far described has been developed by arranging the output turbine vertically on the basis of the horizontal type gas turbine of the prior art. In this horizontal type gas turbine of the prior art, the output shaft is arranged horizontally on the exit side (or on the lower temperature side) of the power turbine, although not shown. The horizontal type gas turbine is not so designed that it may be installed on a narrow place, but has a relatively large allowance for the space around the shaft. As a result, the inside is cooled by the natural ventilation with the ejector effect of the package inside so that no special cooling device is required.

The L-shaped vertical type gas turbine of the prior art thus far described has been developed on the basis of the aforementioned horizontal type gas turbine, and the space 12 around the output shaft 3 is made as small as possible so that the gas turbine plant may be made as compact as possible. Since this space 12 is in contact with the entrance side (or the higher temperature side) of the output turbine 1, on the other hand, only the natural convention is so insufficient that the heat is confined in the portion C of FIG. 4, as has been described hereinbefore. It is, therefore, preferable to provide a fan or the like for the forced cooling. At present, however, the space for the forced cooling is extremely restricted so that a device for enhancing the cooling effect with a small space has been desired. Although the natural ventilation shown in FIG. 5 can achieve a considerable cooling effect, on the other hand, the heat confinement in the portion C of FIG. 4 occurs, and a device for a more sufficient cooling effect has been desired.

SUMMARY OF THE INVENTION

It is, therefore, an object of the invention to provide a cooling structure which is enabled by making use of the ejector effect of a main exhaust gas to have a compact structure to produce a sufficient cooling effect without changing the existing structure of an L-shaped vertical type gas turbine.

In order to achieve this object, according to the invention, there are provided the following means (1) to (3).

(1) A cooling structure around L-shaped vertical type gas turbine output shaft comprising: a gas generator arranged horizontally on a baseplate for generating a gas in a horizontal direction; an output turbine communicating with the gas passage of said gas generator and including an output shaft in a vertical direction; and a casing enclosing said output shaft over said baseplate and the entrance of said turbine, the lower end of said output shaft being coupled through said baseplate to an external apparatus, wherein the improvement comprises a cylinder interposed between the inner circumference of said casing and said output shaft while retaining predetermined clearances and fixed on said baseplate while enclosing said output shaft from said baseplate to the entrance of said turbine, and wherein said clearances are fed with cooling air.

(2) In the aforementioned invention (1), said cooling air is introduced into said cylinder around the lower output shaft to flow upward in said cylinder and out from the upper end of said cylinder and then to flow downward between said cylinder and the inner circumference of said casing.

(3) In the aforementioned invention (1), the air having cooled is released from the clearance between the lower end of the inner circumference of said casing and the lower end of said cylinder.

In the cooling structures (1) to (3) of the invention, the cylinder is disposed around the output shaft so that the ventilation air flows into the cylinder from around the output shaft below the baseplate. The inside of the package of the L-shaped vertical type gas turbine is evacuated by the ejector effect of the exhaust gas of the gas turbine so that the air flows into the cylinder from below the baseplate around the output shaft. This air flows upward in the cylinder and out from the upper end of the cylinder. The inlet portion of the turbine over the cylinder is pressurized with the sealing air so that the air outflow passes downward between the cylinder and the casing around the output shaft and enters the package inside which is under the vacuum in communication below the cylinder. By this air flow of the natural ventilation, the radiant heat is shielded from the output shaft, and the output shaft is effectively cooled therearound. The heat, as might otherwise be confined at the turbine inlet portion, is dissipated by the convection of the natural ventilation.

DESCRIPTION OF THE PREFERRED EMBODIMENT

An embodiment of the invention will be specifically described with reference to the accompanying drawings.

Figure 1:
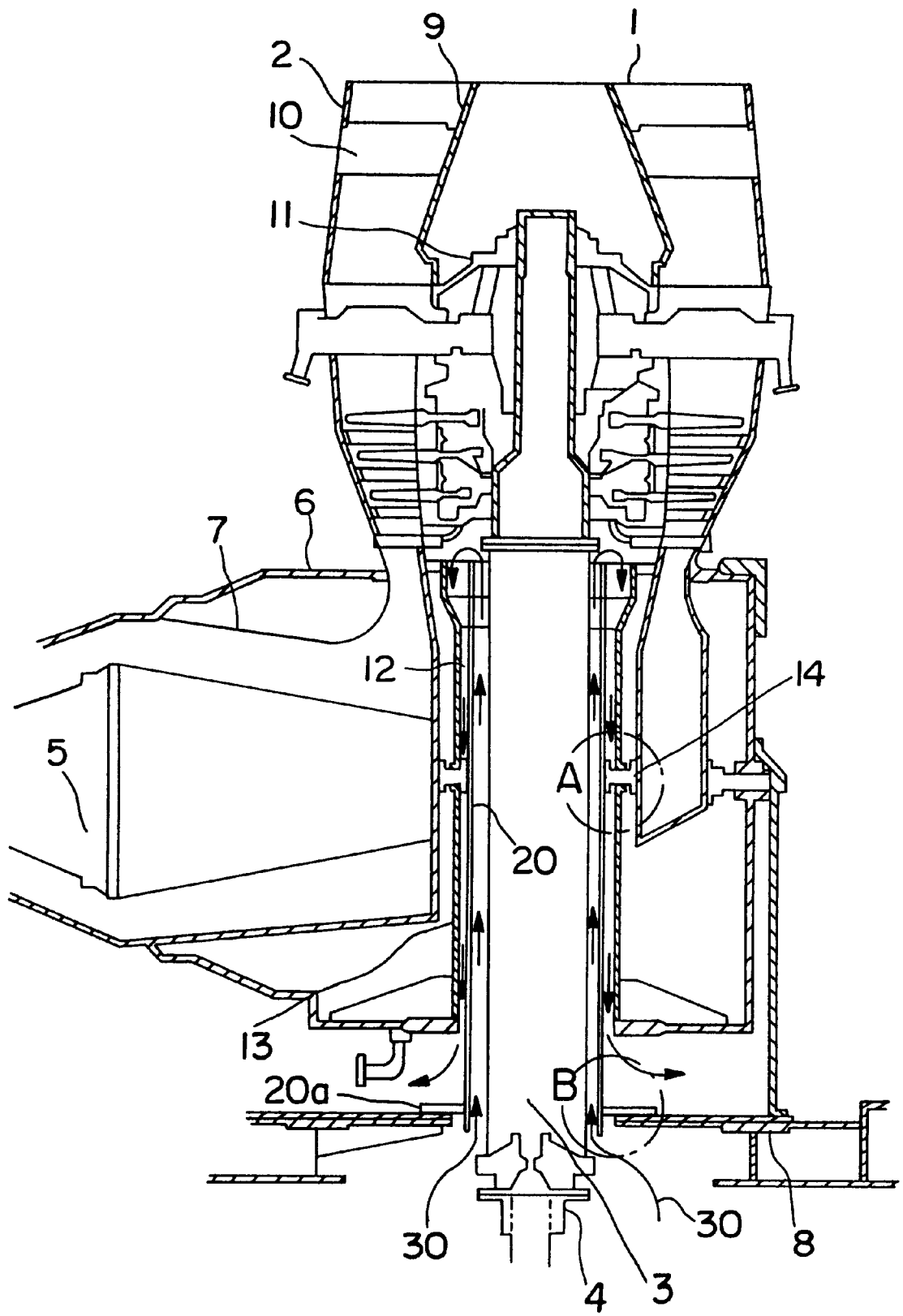
FIG. 1 is a longitudinal section showing a cooling structure around the output shaft of an L-shaped vertical type gas turbine according to one embodiment of the invention.
Figure 4:
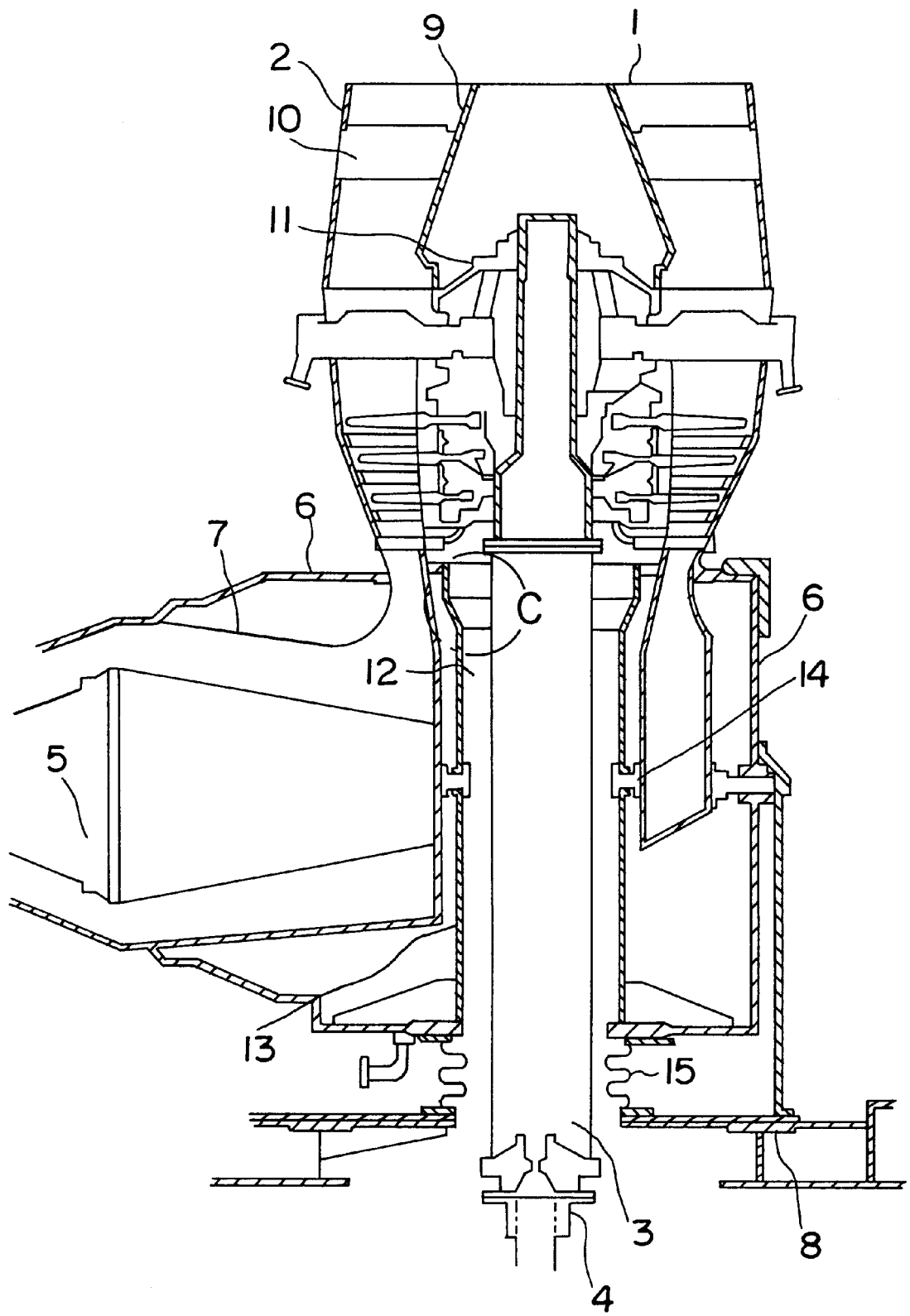
FIG. 4 is a longitudinal section of an L-shaped vertical type gas turbine having been proposed by us and relating to the invention.
Figure 5:
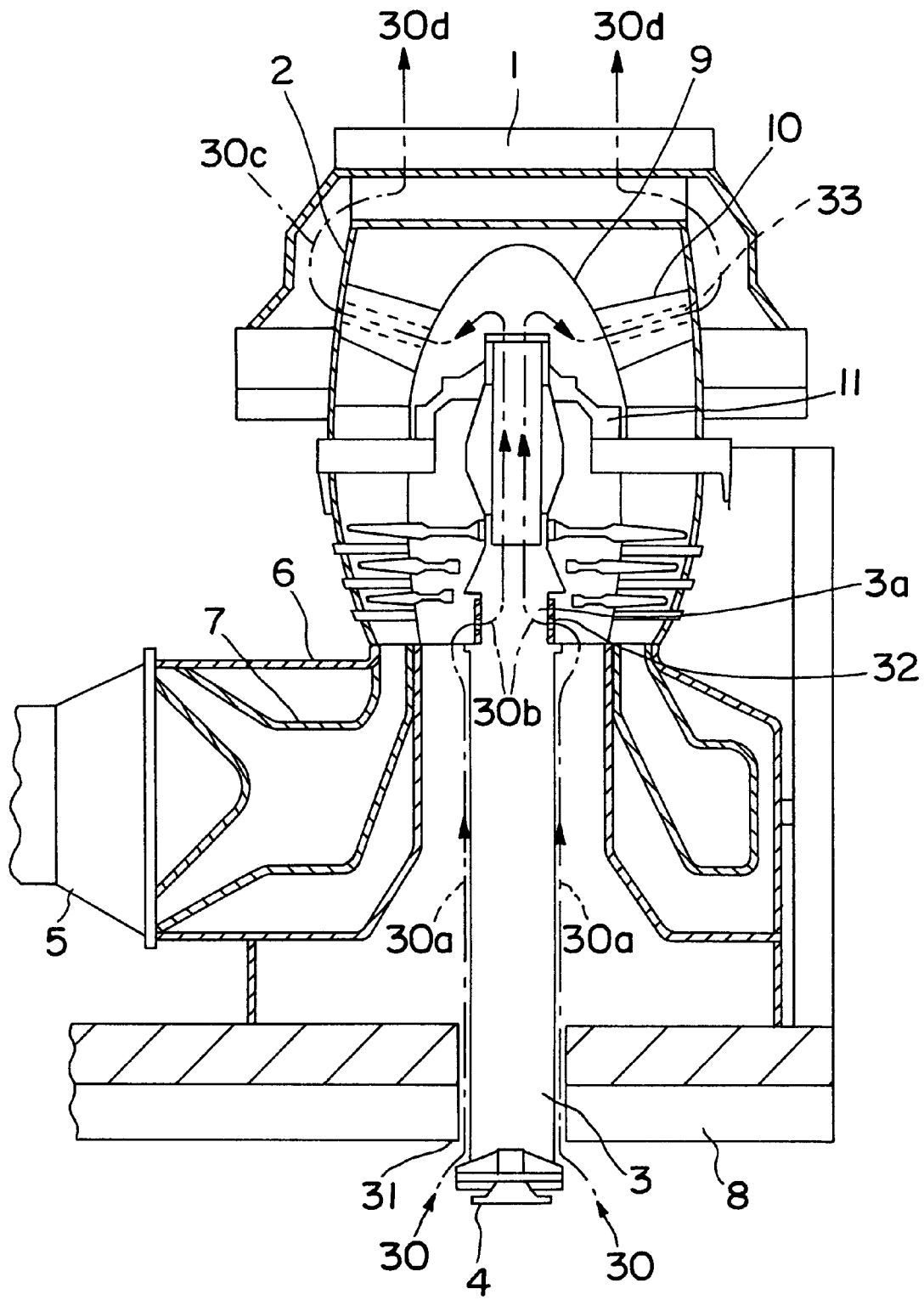
FIG. 5 is a longitudinal section showing a cooling structure of another L-shaped vertical type gas turbine having been proposed by us and relating to the invention.

FIG. 1 is a longitudinal section showing a cooling structure around the output shaft of an L-shaped vertical type gas turbine according to one embodiment of the invention. In FIG. 1, the reference numerals 1 to 14 designate portions identical to those shown in FIG. 4 and having the common functions so that they are quoted as they are while their detailed descriptions being omitted. A portion featuring the invention is located at a cylinder designated by numeral 20. These portions will be detailed in the following.

In FIG. 1, the cylinder 20 is inserted into the space 12 and is fixed at its lower end on the baseplate 8 by a flange 20a which is fixed thereon.

A clearance (d1) is formed between the outer circumference of the cylinder 20 and the cylindrical casing 13, and a clearance (d2) is formed between the inner circumference of the cylinder 20 and the outer surface of the output shaft 3. These clearances d1 and d2 have a specific size of about 50 mm in the actual machine and allow cooling air 30 to flow therethrough, as will described in the following.

Figure 2:
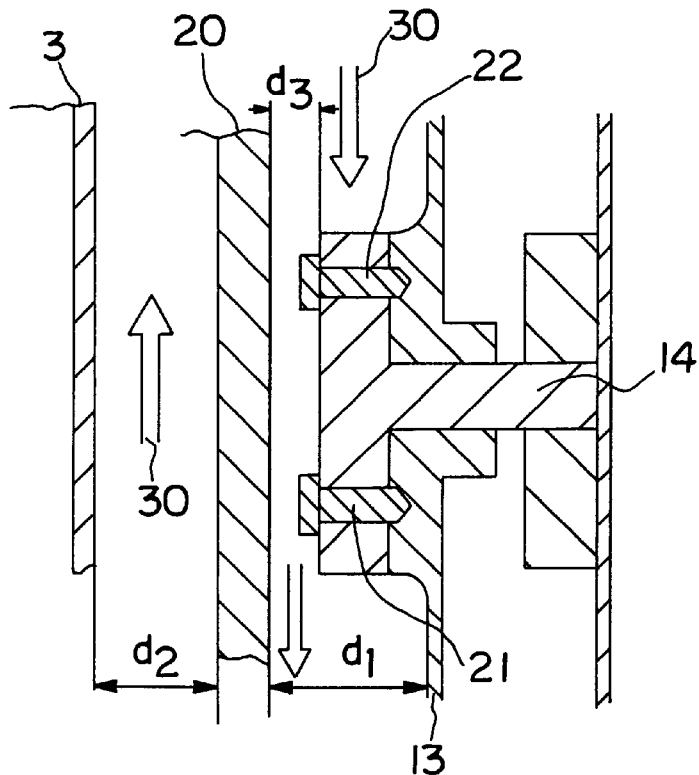
FIG. 2 is an enlarged detailed section of a portion A of FIG. 1.

FIG. 2 is an enlarged detailed section of a portion A of FIG. 1 The cylindrical casing 13 is fixed in the outer casing through the support portion 14 by support members 21 and 22. The clearance d1 is formed between the outer surface of the cylinder 20 and the inner circumference of the cylindrical casing 13, and the clearance d2 is formed between the outer surface of the output shaft 3 and the inner circumference of the cylinder 20. This cylinder 20 is so mounted as to retain a clearance d3 between its outer circumference and the support portion 14 thereby to retain a passage for the cooling air 30.

Figure 3:
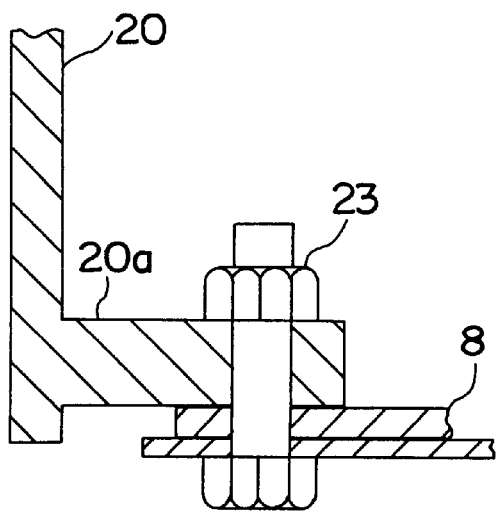
FIG. 3 is an enlarged detailed section of a portion B of FIG. 1.

FIG. 3 is an enlarged detailed section of a portion B in FIG. 1 and shows the mounted lower end portion of the cylinder 20. As shown, the flange 20a is fixed at the lower end of the cylinder 20 circumferentially, and the lower end of this cylinder 20 is mounted on the baseplate 8 through the flange 20a by bolts/nuts 23. On the other hand, the cylinder 20 is thus directly fixed on the baseplate but can be mounted through another member, as the case may be.

In the L-shaped vertical type gas turbine thus constructed, the package inside is evacuated by the ejector effect of the exhaust gas of the combustion gas. Since the package inside is under a vacuum, the external cooling air is sucked from below the baseplate 8, as shown in FIG. 1, to rise through the clearance between the cylinder 20 and the output shaft 3 so that it flows out from above the cylinder 20. This air outflow comes into the clearance between the cylinder 20 and the cylindrical casing 13.

The clearance between the cylinder 20 and the cylindrical casing 13 communicates from its lower portion with the package inside which is under the vacuum. As a result, the cooling air 30 flows downward from the upper end of the cylinder 20 through the clearance between the cylinder 20 and the cylindrical casing 13 so that it is discharged into the package.

According to the cooling structure around the output shaft of the L-shaped vertical type gas turbine of the embodiment thus far described, the cylinder 20 is mounted around the output shaft 3 so that the cooling air 30 from between the cylinder 20 and the output shaft 3 may be sucked from below the baseplate 8 by the ejector effect and so that the cooling air 30 having flown out from the upper end of the cylinder may flow out from the clearance between the cylinder 20 and the cylindrical casing 13 into the package. As a result, the cooling air is fed to around the output shaft 3 by the natural ventilation to cool the circumference of the output shaft 3 effectively while shielding the output shaft 3 from the radiant heat so that the stagnation of heat of the prior art can be eliminated to eliminate the device such as a ventilation fan thereby to improve the reliability.

What is claimed is:

1. A cooling structure around an L-shaped vertical type gas turbine output shaft comprising: a gas generator arranged horizontally on a baseplate for generating a gas in a horizontal direction; an output turbine communicating with the gas passage of said gas generator and including an output shaft in a vertical direction; and a casing enclosing said output shaft over said baseplate and the entrance of said turbine, the lower end of said output shaft being coupled through said baseplate to an external apparatus, wherein the improvement comprises a cylinder interposed between the inner circumference of said casing and said output shaft while retaining predetermined clearances and fixed on said baseplate while enclosing said output shaft from said baseplate to the entrance of said turbine, and wherein said clearances are fed with cooling air.

2. A cooling structure around an L-shaped vertical type gas turbine output shaft according to claim 1, wherein said cooling air is introduced into said cylinder around the lower output shaft to flow upward in said cylinder and out from the upper end of said cylinder and then to flow downward between said cylinder and the inner circumference of said casing.

3. A cooling structure around an L-shaped vertical type gas turbine output shaft according to claim 1, wherein the air having cooled is released from the clearance between the lower end of the inner circumference of said casing and the lower end of said cylinder.

* * * * *